United States Patent
Grosjean et al.

(10) Patent No.: US 10,976,340 B2
(45) Date of Patent: Apr. 13, 2021

(54) ELECTRONIC DEVICE FOR MEASURING A PHYSICAL PARAMETER

(71) Applicant: EM Microelectronic-Marin SA, Marin (CH)

(72) Inventors: Sylvain Grosjean, Les Fins (FR); Yonghong Tao, Singapore (SG); Alexandre Deschildre, Marin (CH); Hugues Blangy, Grandcour (CH)

(73) Assignee: EM Microelectronic-Marin SA, Marin (CH)

( * ) Notice: Subject to any disclaimer, the term of this patent is extended or adjusted under 35 U.S.C. 154(b) by 317 days.

(21) Appl. No.: 16/210,005

(22) Filed: Dec. 5, 2018

(65) Prior Publication Data
US 2019/0178909 A1   Jun. 13, 2019

(30) Foreign Application Priority Data

Dec. 7, 2017   (EP) .................................... 17205858

(51) Int. Cl.
*G01P 15/125*   (2006.01)
*G01D 5/24*   (2006.01)
(Continued)

(52) U.S. Cl.
CPC .............. *G01P 15/125* (2013.01); *G01D 5/24* (2013.01); *G01P 1/006* (2013.01); *G01P 15/0897* (2013.01)

(58) Field of Classification Search
CPC .......... G01P 15/125; G01P 1/006; G01D 5/24
See application file for complete search history.

(56) References Cited

U.S. PATENT DOCUMENTS 7,287,429 B2 * 10/2007 Umemura ............. G01P 15/125
                                                    73/514.32
7,368,923 B2 *  5/2008 Foote ....................... G01D 5/24
                                                      324/658

(Continued)

OTHER PUBLICATIONS

European Search Report dated Feb. 27, 2018 in European Application 17205858.8 filed on Dec. 7, 2017 (with English Translation of Categories of Cited Documents).

(Continued)

*Primary Examiner* — Walter L Lindsay, Jr.
*Assistant Examiner* — Milton Gonzalez
(74) *Attorney, Agent, or Firm* — Oblon, McClelland, Maier & Neustadt, L.L.P.

(57) ABSTRACT

An electronic measuring device for measuring a physical parameter includes a differential analogue sensor formed from two capacitances—an excitation circuit of the differential analogue sensor providing to the sensor two electrical excitation signals which are inverted—a measuring circuit which generates an analogue electrical voltage which is a function determined from the value of the sensor, and a circuit for compensating for a possible offset of the sensor, which is formed from a compensation capacitance, which is excited by its own electrical excitation signal. The excitation circuit is arranged in order to be able to provide to an additional capacitance of the compensation circuit its own electrical excitation signal having a linear dependence on the absolute temperature with a determined proportionality factor in order to compensate for a drift in temperature of an electrical assembly of the measuring device comprising at least the compensation capacitance.

18 Claims, 4 Drawing Sheets

(51) Int. Cl.
*G01P 1/00* (2006.01)
*G01P 15/08* (2006.01)

(56) References Cited

U.S. PATENT DOCUMENTS

| | | | |
|---|---|---|---|
| 9,423,308 B2 * | 8/2016 | Brookhuis | ............... G01L 1/148 |
| 2004/0237651 A1 | 12/2004 | Furuichi | |
| 2008/0302182 A1 | 12/2008 | Katashi | |
| 2010/0219848 A1 | 9/2010 | Gotoh et al. | |
| 2015/0346236 A1 * | 12/2015 | Flamm | .................. G01P 15/131 |
| | | | 73/514.32 |

OTHER PUBLICATIONS

Final Notice of the Reason of Refusal dated Jun. 30, 2020 in Japanese Patent Application No. 2018-227042 (with English translation), 3 pages.

\* cited by examiner

ELECTRONIC DEVICE FOR MEASURING A PHYSICAL PARAMETER

CROSS-REFERENCE TO RELATED APPLICATION

This application claims priority to European Patent Application No. 17205858.8 filed on Dec. 7, 2018, the entire disclosure of which is hereby incorporated herein by reference.

TECHNICAL FIELD

The present invention relates to the field of electronic devices for measuring a physical parameter, in particular an accelerometer of the capacitive type.

TECHNOLOGICAL BACKGROUND

With reference to the annexed FIG. 1, an electronic device for measuring a physical parameter, such as is found on the market, will be described. This measuring device 2 comprises:
- an analogue sensor 4 comprising a passive differential electrical component formed from two capacitances C1 & C2 of substantially the same value, the electrical value provided at the output of the electrical component, to the common terminal BC of the two capacitances, varying as a function of the detected physical parameter, in particular an acceleration,
- an excitation circuit 6 of the analogue sensor providing, to the passive differential electrical component, two inverted electrical excitation signals 16 and 17 which are respectively applied periodically to the two capacitances in order to effect successive measurements of the physical parameter,
- a measuring circuit 8 comprising an amplifier 12 which, connected to a feedback loop 14 forming this measuring circuit, generates, at output, an electrical voltage $V_{out}$ which is a function determined, in particular preferably proportionally, from the value of the passive differential electrical component, and
- a circuit 10 for compensating for a possible offset of the analogue sensor 4, this compensation circuit being formed from a compensation capacitance $C_{OS}$ which is excited by the excitation circuit 6, the latter providing, at the compensation capacitance $C_{OS}$, an electrical excitation signal 18.

The electrical excitation signals 16, 17 and 18 consist of transitions between a lower/low voltage $V_{SS}$ of the electrical supply and a higher/high voltage $V_{DD}$ of this electrical supply ($V_{DD}$ defining the supply voltage), these transitions being applied respectively to the inputs E1, E2 and E3. More precisely, the signal 16 produces transitions of $V_{SS}$ to $V_{DD}$ when the signal 17 simultaneously produces transitions of $V_{DD}$ to $V_{SS}$. Hence, the electrical signal resulting at the common terminal BC of the two capacitances C1 and C2 has a variable component which is proportional to the difference of the respective values of these two capacitances, i.e. proportional to—$C_{MEMS}$ with $C_{MEMS}$=C2−C1.

It is known that sensors of the MEMS type, in particular differential capacitance sensors, produce, with standard manufacturing techniques, a fairly broad dispersion of their respective offsets. Hence, there has been provided a capacitance $C_{OS}$ for compensating for an offset which is programmable. Its programming is effected generally during the test of the electronic measuring device. If the offset is negative, i.e. $C_{MEMS}$ has a negative value for a zero value of the detected physical parameter (for example a zero acceleration for an accelerometer), then the electrical excitation signal 18 is selected with a descending transition. Conversely, if the offset is positive, the signal 18 is selected with a rising transition of $V_{DD}$ towards $V_{SS}$ as provided in FIG. 1.

The capacitance $C_{OS}$ receives, simultaneously at the sensor 4, an electrical excitation signal 18 which consists of a transition between $V_{SS}$ and $V_{DD}$. As the nodes N1 and N2 on the feedback loop 14 are maintained at the reference voltage $V_{Gnd}$ by the amplifier 12 and this feedback loop, the reference capacitance $C_{Ref}$ provided on the feedback loop has a variable voltage, the value of which is proportional to the sum of the voltages, generated, on the one hand, by the sensor 4 and, on the other hand, by the compensation circuit. Hence, the capacitance $C_{Ref}$ has a voltage which is proportional to $C_{MEMS}-C_{OS}$. The voltage of the reference capacitance $C_{Ref}$ defines the analogue output voltage $V_{out}$ which is therefore proportional to $C_{MEMS}-C_{OS}$ and likewise proportional to the physical parameter measured to the extent that the offset of the sensor is entirely corrected by the compensation circuit. The measuring circuit 8 provides, at output, a digital measuring signal $S_{dig}$ by means of an analogue-digital converter ADC, this digital signal being in theory proportional to the measured physical parameter.

SUMMARY OF THE INVENTION

The object of the invention is to increase the precision of the measuring device of the prior art, described above, by decreasing its dependence on the temperature, whilst maintaining a relatively small manufacturing cost.

The differential sensor described above can have a certain dependence on the temperature but it is found that the element, the dependence in temperature of which causes the greatest drift in temperature in the measuring signal, is the capacitance $C_{OS}$ for compensating for the offset, especially if a normal common technique is adhered to in order to produce this capacitance. It will be noted that the variation in the value of the capacitance $C_{OS}$ as a function of the temperature depends on the manufacturing technology of the measuring circuit and in particular on the compensation circuit which generally form together with the excitation circuit one and the same integrated circuit. Within the scope of the invention, thus firstly it is sought to compensate for the drift in temperature of the capacitance $C_{OS}$, but the invention also makes it possible to take into account a possible drift in temperature of the sensor, which is very advantageous.

To this end, the invention relates to an electronic device for measuring a physical parameter comprising:
- an analogue sensor formed from a passive differential electrical component, the value of which varies as a function of the physical parameter,
- an excitation circuit of the analogue sensor arranged in order to provide, to the passive differential electrical component, at least one first electrical excitation signal,
- a measuring circuit comprising an amplifier which, connected to a feedback loop forming this measuring circuit, is provided in order to generate, at output, an electrical voltage which is a certain function of said value of said passive differential electrical component, and
- a circuit for compensating for an offset of said passive differential electrical component, this compensation circuit being formed from a first passive electrical component, said excitation circuit being arranged in order to provide, to this first passive electrical component, a second electrical excitation signal;

this electronic device being characterised in that said excitation circuit is arranged in order to be able to provide, to an electrical component of the compensation circuit, an electrical excitation signal having an affine dependence or a linear dependence on the absolute temperature with a determined proportionality factor, the proportionality factor being selected in order to compensate for a drift in temperature of an electrical assembly of the measuring device comprising at least the first passive electrical component.

In an advantageous embodiment, the electrical assembly comprises furthermore the passive differential electrical component forming the sensor.

In a first embodiment, the electrical component of the compensation circuit, the drift in temperature of which is compensated for, is said first passive electrical component and the electrical excitation signal is therefore said second electrical excitation signal. According to the invention, the second electrical excitation signal has a value/amplitude which is an affine function of the absolute temperature.

In a second embodiment, the electrical component of the compensation circuit, the drift in temperature of which is compensated for, is a second passive electrical component which is incorporated in the compensation circuit. The electrical excitation signal which is applied to this second electrical component is a third electrical excitation signal, the amplitude of which is substantially a linear function of the absolute temperature, the second electrical excitation signal provided to the first passive electrical component being a constant amplitude signal.

The electronic measuring device according to the invention has several advantages. In particular, the invention is advantageous in that it proposes compensation of the analogue type with electrical elements which are easily producible, in particular the compensation circuit can be produced entirely in the same technology as the measuring circuit. In fact, the person skilled in the art would think firstly of correcting a drift in temperature at the level of the manufacturing technology of the measuring circuit, in particular by using an MiM technology in order to produce the offset compensation capacitance. But such a solution is expensive. Another solution which may come to mind for the person skilled in the art is a correction implemented in a logic circuit receiving the signal $S_{dig}$, but such a solution poses, amongst others, the problem of determining the temperature to which the analogue measuring circuit is subjected.

On the other hand, the solution according to the invention is less costly and it does not require a temperature sensor which provides a temperature signal to a logic circuit. Compensation for the drift in temperature is effected by means of a variable voltage generated to this end by the excitation circuit which comprises, for example, a current source which is proportional to the absolute temperature, known to the person skilled in the art, this current source making it possible to generate a certain voltage which is likewise proportional to the absolute temperature which is applied, either to the offset compensation component (first embodiment), or to an additional component dedicated to compensation for the drift in temperature of the offset compensation component (second embodiment).

BRIEF DESCRIPTION OF THE FIGURES

The invention will be described hereafter in more detail with the help of the annexed drawings, given by way of non-limiting examples, in which.

DETAILED DESCRIPTION OF THE INVENTION

Figure 2:
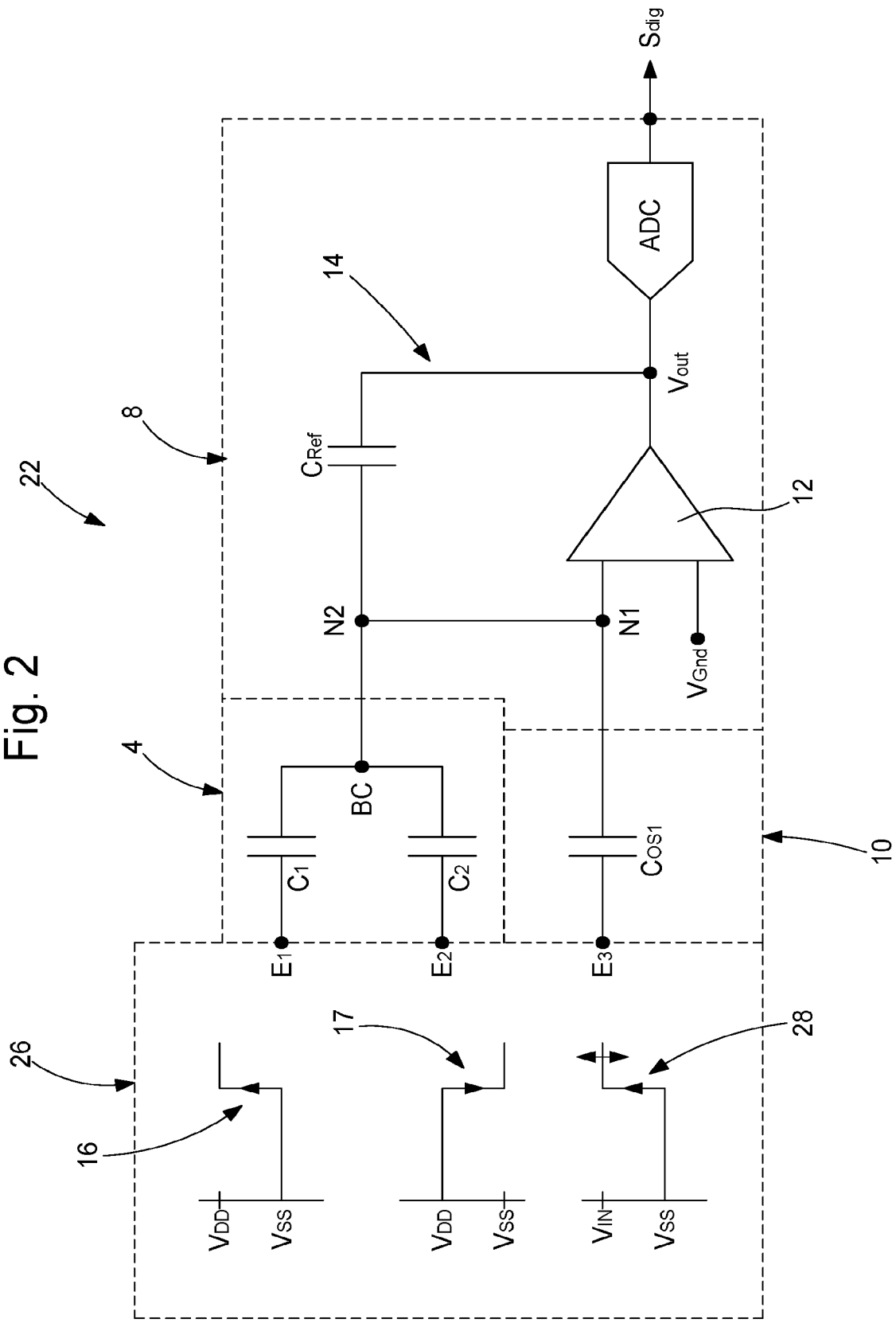
FIG. 2 represents the electronic diagram of a first embodiment according to the invention.

With the help of FIGS. 2 to 4, a first embodiment of an electronic device for measuring a physical parameter, in particular an accelerometer, will be described hereafter.

Like the previously described measuring device of prior art, the measuring device 22 comprises:

an analogue sensor 4 formed from a differential capacitance, i.e. a pair of capacitances C1, C2, which are arranged in parallel and provided with identical values, these two capacitances being excited by inverted signals 16, 17 applied respectively to the two inputs E1 and E2, in order to provide, to the common output terminal BC, an electrical signal corresponding to a difference between the two respective electrical signals generated by the two capacitances and the value of which varies as a function of the physical parameter under consideration, an excitation circuit 26 of the analogue sensor providing, to two inputs E1 and E2 of differential capacitance C2–C1, the two electrical excitation signals 16, 17, a measuring circuit 8 comprising an amplifier 12 which, connected to a feedback loop 14 forming this measuring circuit, generates, at output, an electrical voltage $V_{out}$ which is a function determined from the value of the electrical signal supplied by the analogue sensor 4, and a circuit 10 for compensating for an offset of the analogue sensor, this compensation circuit being formed from a compensation capacitance $C_{OS}1$ which is excited by the excitation circuit 26.

The two capacitances C1 and C2 have their common terminal BC which is connected to the feedback loop 14 and via the latter to a first input of the amplifier 12, this amplifier having a second input which receives a reference voltage $V_{Gnd}$ (earth voltage). The amplifier maintains the reference voltage at the common terminal BC. As explained previously, the feedback loop 14 comprises a reference capacitance $C_{Ref}$ which determines the value of the electrical output voltage $V_{out}$ of the amplifier, this voltage $V_{out}$ defining the analogue measuring signal produced by the measuring circuit 8 which receives a first electrical signal from the sensor 4 and a second electrical signal from the compensation circuit 10. The analogue measuring signal is then provided to an ADC converter which converts it into a digital signal $S_{dig}$. The programmable capacitance COS1 has a terminal, defining the output terminal of the compensation circuit, which is connected to said first input of said amplifier 12 and thus likewise to the feedback loop 14. More precisely, the output terminal of the compensation circuit is directly connected to a node N1 of the feedback loop, whilst the common terminal BC of the sensor 4 is connected directly to a node N2 of this feedback loop, the nodes N1 and N2 being preferably connected directly to each other, as represented in FIG. 2, and forming electrically one and the same node.

According to the invention, the excitation circuit 26 is arranged in order to be able to provide, to the analogue sensor 4, two electrical signals 16 and 17 which have a maximum amplitude (voltage transition provided between $V_{SS}$ and $V_{DD}$ and inversely) and to an input terminal E3 of the compensation capacitance $C_{OS}1$, an electrical excitation signal 28 which has a voltage transition between the lower supply voltage $V_{SS}$ and a variable voltage $V_{IN}$, the latter having an affine dependence on the absolute temperature. In other words, the electrical excitation signal 28 has a value/an amplitude which is an affine function of the absolute temperature.

The component of the voltage $V_{IN}$ which is variable as a function of the temperature has a determined proportionality factor which is selected in order to compensate for a drift in temperature of an electrical assembly of the measuring device 22 comprising at least the compensation capacitance $C_{OS}1$. In an advantageous variant, the electrical assembly which is compensated for in temperature comprises furthermore the differential sensor 4.

The constant component of the signal $V_{IN}$ is provided such that the offset of the analogue sensor 4 is compensated for at a certain temperature, for example 25° C. There are two possible variants for compensating precisely for the offset. Either a compensation capacitance $C_{OS}1$ of fixed value is provided and the constant component of the electrical excitation signal of this capacitance is adjusted, or a constant component of the electrical excitation signal of the capacitance $C_{OS}1$ with a fixed value, for example 90% of $V_{DD}$, is provided, and the capacitance $C_{OS}1$ is provided to be programmable.

Figure 1:
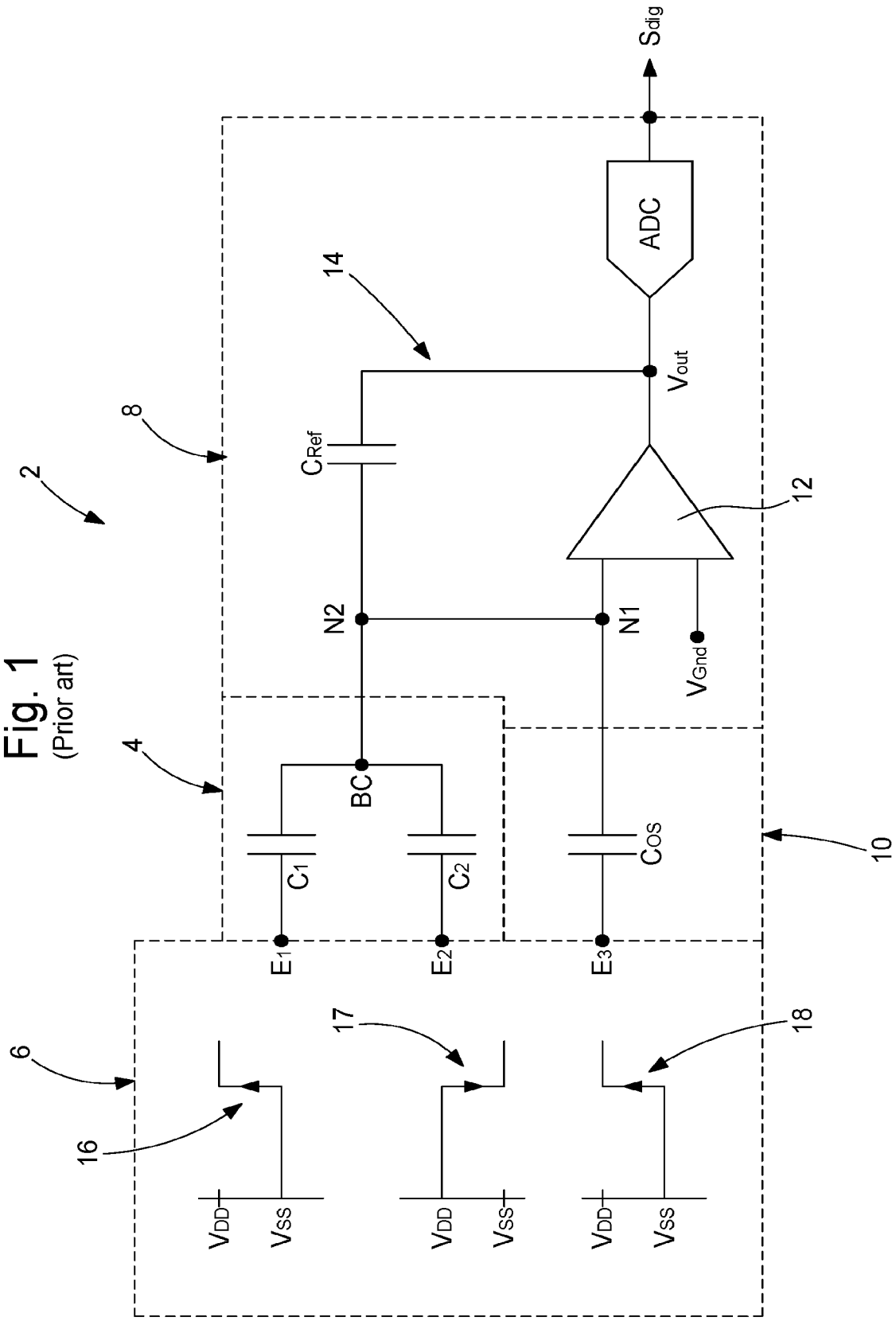
FIG. 1, already described, represents the electronic diagram of a device for measuring a physical parameter of the differential capacitance type of prior art, this device being used in particular as an accelerometer.

The variable component $V_{PTAT}$ of the voltage $V_{IN}$ is provided proportional to the absolute temperature. The affine function 30 on a temperature scale expressed in degrees Celsius [° C.] is represented in FIG. 3 for a typical case. The voltage $V_{PTAT}$ has a value of approx. 38 mV at 25° C. and it varies, with a positive gradient, by approx. 16 mV for a variation in temperature of 125° C. (−40° C. to 85° C.). The positive gradient provided here serves to compensate for a negative coefficient of the compensation capacitance for the dependence of its electric value as a function of the temperature. In this example, the voltage $V_{PTAT}$ produces an increase in the constant component, for which reason it is provided to be lower than the supply voltage $V_{DD}$ which is the highest available voltage. By way of example, $V_{DD}$ equals 1 Volt and $V_{IN}=0.9$ Volt+$V_{PTAT}$. In contrast, if the dependence on temperature of the capacitance $C_{OS}1$ is positive, then there is provided for $V_{PTAT}$ negative values with a negative gradient. In this latter case, there can be selected for the constant component of the voltage $V_{IN}$ the supply voltage $V_{DD}$ then the variable component is negative and comes therefore to decrease the constant component. It will be noted that, for a given sensor, the value of the capacitance $C_{OS}1$ is not identical to that of the capacitance $C_{OS}$ provided in the prior art in FIG. 1, because if the value of the capacitance $C_{OS}$ is provided in order to compensate for the offset of the sensor, for example at 25° C., for a voltage transition between $V_{SS}$ and $V_{DD}$, the voltage applied to the capacitance $C_{OS}1$ during the voltage transition of the signal 28 is lower than $V_{DD}$. Thus the capacitance $C_{OS}1$ has, in this case, a value greater than that of the capacitance $C_{OS}$ in order to produce the same compensation at 25° C.

Figure 3:
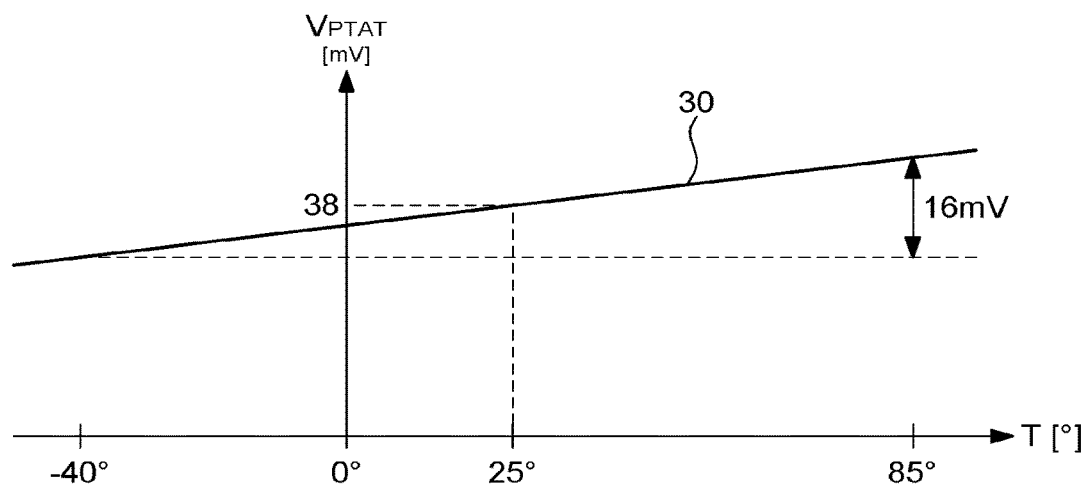
FIG. 3 shows the graph of a voltage $V_{PTAT}$ applied to a capacitance of the compensation circuit in order to correct a drift in temperature.
Figure 4:
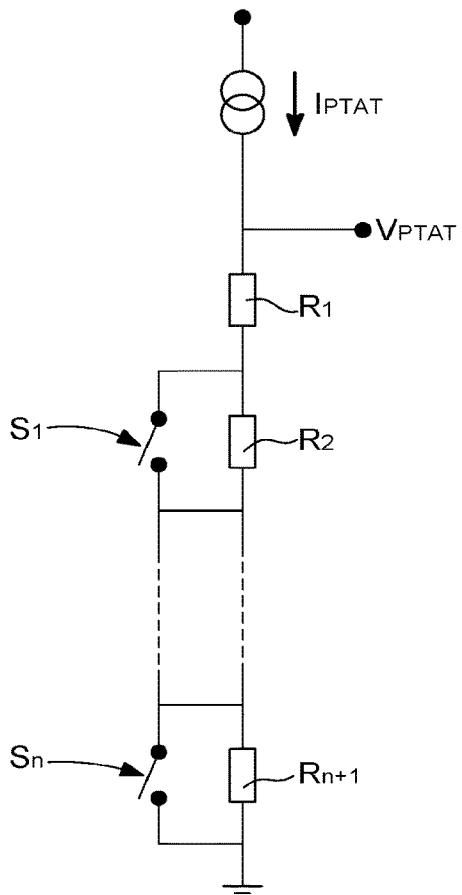
FIG. 4 shows an electrical diagram of a circuit for generating the voltage $V_{PTAT}$ and making it possible to vary the proportionality coefficient between this voltage and the temperature.

FIG. 4 shows a part of the excitation circuit 26 provided in order to generate the variable voltage $V_{PTAT}$ of FIG. 3. There is integrated in the excitation circuit a current source $I_{PTAT}$ providing a current which varies proportionally with the absolute temperature. Such a current source is known to the person skilled in the art. It is obtained only by a particular electronic design which results in the current source intrinsically providing a current, the value of which is proportional to the absolute temperature. It is therefore a natural feature of the electronic circuit which results from the properties of MOS and/or bipolar transistors. In order to produce the variable voltage $V_{PTAT}$ with a gradient which may be selected precisely as a function of the dependence on temperature of the compensation capacitance, a plurality of switchable resistances $R_2$ to $R_{n+1}$ (controlled by the interrupters $S_1$ to $S_n$) which are arranged in series with a first resistance $R_1$ are provided. The variable current $I_{PTAT}$ passes therefore through the resistance $R_1$ and other resistances which are selected.

In general, in the first embodiment, the compensation capacitance of the offset of the sensor likewise has a function of compensating for or correcting a drift in temperature of this compensation capacitance in association with a specific excitation signal, provided to be variable as a function of the temperature.

Figure 5:
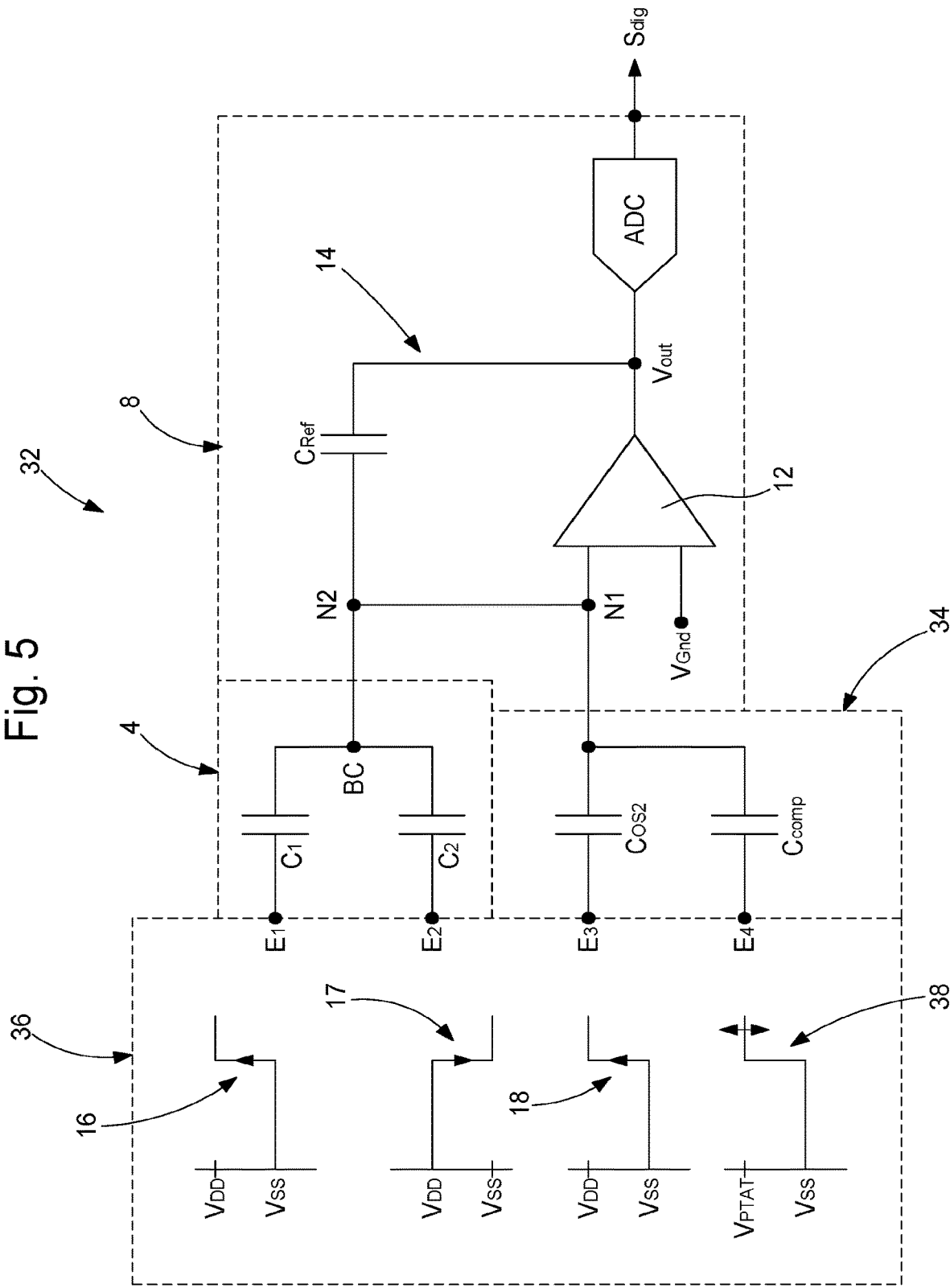
FIG. 5 represents the electronic diagram of a second embodiment according to the invention.

With reference to FIG. 5, hereafter a second embodiment of the invention will be described. The elements similar to those of the first embodiment and bearing the same references will not be described again here. The measuring device 32 differs from the measuring device 22 described above by the arrangement of the compensation circuit 34 and of the excitation circuit 36. The measuring device 32 is distinguished from the measuring device 22 by the fact that the compensation for the offset of the sensor via the capacitance $C_{OS}2$ and the compensation for the drift in temperature of this capacitance $C_{OS}2$ are separate. More precisely, the programmable capacitance $C_{OS}2$ receives, as in the prior art represented in FIG. 1, an excitation signal formed by a transition between the voltages $V_{SS}$ and $V_{DD}$, i.e. between the two fixed supply voltages. However, it will be noted that the value of this programmable capacitance, for a given analogue sensor 4, is not identical to that of the prior art because an additional capacitance $C_{comp}$ is provided in order to compensate for the drift in temperature of the programmable capacitance $C_{OS}2$. Thus, in the prior art, the value of the capacitance $C_{OS}$ is selected in order to compensate for the offset, for example at a temperature of 25° C., whilst the value of the capacitance $C_{OS}2$ is in fact selected in order to compensate for an offset at a temperature substantially corresponding to absolute zero (−273° C.).

As indicated above, in order to compensate for the drift in temperature of the programmable capacitance $C_{OS}2$, an additional capacitance $C_{comp}$ is provided in the compensation circuit 34. This additional capacitance $C_{comp}$ is arranged in parallel to the capacitance $C_{OS}2$. The output terminal of the additional capacitance $C_{comp}$ is connected to the output terminal of the capacitance $C_{OS}2$. This common output terminal is connected to a first input of the amplifier 12 (described within the scope of the first embodiment). The additional capacitance $C_{comp}$ receives, at its input terminal E4, its own excitation signal 38 which consists of a voltage transition between the voltage $V_{SS}$ and a voltage $V_{PTAT}$, this signal being generated by the excitation circuit simultaneously with the other electrical signals 16, 17 and 18. The additional capacitance $C_{comp}$ can be provided with the same value as that of the capacitance $C_{OS}2$, but this is not essential. What is of importance is that the value of the electrical charge generated during application of the excitation signal 38, i.e. the result of the value of the capacitance $C_{comp}$ multiplied by the voltage $V_{PTAT}$, this result having to compensate for the variation in electrical charge provided by the capacitance $C_{OS}2$ as a function of the temperature. The additional capacitance $C_{comp}2$ can be provided to be programmable or not. The voltage $V_{PTAT}$ corresponds for example to the graph 30 of FIG. 3, possibly with a different proportionality coefficient, and its generation can be effected as represented in FIG. 4, with a selection of the proportionality coefficient. It will be noted that if the dependence on temperature of the capacitance $C_{OS}2$ is positive so that the compensation for this dependence must be negative, then the measuring device 32 will be arranged such that the excitation signal 38 consists of a transition between $V_{DD}$ and $V_{DD}+V_{PTAT}$ with $V_{PTAT}$ having a negative value. It will be understood that these considerations apply in the case of a transition of $V_{SS}$ to $V_{DD}$ in the signal 18 applied to the capacitance $C_{OS}2$; if not, it is the inverse which takes place.

In general, in the second embodiment, the electrical excitation signal provided to the capacitance for compensating for a drift in temperature is a signal, the amplitude of which is substantially a linear function of the absolute temperature, whilst the electrical excitation signal provided to the capacitance for compensating for an offset of the sensor is a constant amplitude signal.

Various advantages of the invention are:
- a compensation/correction for the dependence on temperature of the measuring device, including the analogue sensor or not;
- the elements provided for the compensation in temperature are all integrated in the electronic measuring circuit connected to the analogue sensor;
- the compensation in temperature is provided to be adjustable;
- almost no negative impact on the electrical consumption of the measuring device;
- almost no noise generated in the signal by the compensation in temperature;
- the various elements provided for the compensation in temperature do not require use of special and expensive technologies;
- increase in the surface of the integrated circuit forming the measuring device is marginal;
- in a developed variant, not only the dependence on temperature of the capacitance for compensation for an offset of the sensor can be corrected, but likewise that of an assembly comprising the sensor and this compensation capacitance.

Finally, it will be noted that the invention can be applied analogously to a measuring device of the resistive type with a sensor formed from a differential resistance, i.e. two resistances in parallel.

The invention claimed is:

1. An electronic device for measuring a physical parameter comprising:
   an analogue sensor formed from a passive differential electrical component, the value of which varies as a function of the physical parameter,
   an excitation circuit of the analogue sensor arranged in order to provide, to the passive differential electrical component, at least one first electrical excitation signal,
   a measuring circuit comprising an amplifier which, connected to a feedback loop forming said measuring circuit, is provided in order to generate, at output, an electrical voltage which is a certain function of said value of said passive differential electrical component, and
   a circuit for compensating for an offset of said passive differential electrical component, this compensation circuit being formed from a first passive electrical component, said excitation circuit being arranged in order to provide, to this first passive electrical component, a second electrical excitation signal,
   wherein said excitation circuit is arranged in order to be able to provide, to an electrical component of the compensation circuit, an electrical excitation signal having an affine dependence or a linear dependence on the absolute temperature with a determined proportionality factor, the proportionality factor being selected in order to compensate for a drift in temperature of an electrical assembly of the measuring device comprising at least the first passive electrical component of the compensation circuit.

2. The electronic measuring device according to claim 1, wherein said electrical assembly comprises furthermore said passive differential electrical component.

3. The electronic measuring device according to claim 2, wherein said electrical component of the compensation circuit is said first passive electrical component, and said electrical excitation signal is said second electrical excitation signal; and wherein the second electrical excitation signal has an amplitude which is an affine function of the absolute temperature.

4. The electronic measuring device according to claim 3, wherein said passive differential electrical component is formed from a first capacitance and from a second capacitance which are arranged in parallel, the first electrical excitation signal being intended for the first capacitance, whilst a third electrical signal, inverted relative to the first electrical signal and able to be generated by the excitation circuit, is supplied to the second capacitance.

5. The electronic measuring device according to claim 4, wherein the first and second capacitances have a common terminal which is connected to the feedback loop and to a first input of the amplifier, this amplifier having a second input which receives a reference voltage, in particular an earth voltage, which is applied to said common terminal by the amplifier and the feedback loop; and wherein the feedback loop comprises a reference capacitance which determines the value of said electrical output voltage of the amplifier, this value being substantially proportional to the value of said physical parameter.

6. The electronic measuring device according to claim 5, wherein the first passive electrical component is a programmable capacitance for compensating for the offset and for a drift in temperature of said electrical assembly, this programmable capacitance having a terminal which is connected to the first input of said amplifier.

7. The electronic measuring device according to claim 2, wherein said electrical component of the compensation circuit is a second passive electrical component; and wherein said electrical excitation signal is a third electrical excitation signal, the amplitude of which is substantially a linear function of the absolute temperature, the second electrical excitation signal, which is intended for the first passive electrical component, being a constant amplitude signal.

8. The electronic measuring device according to claim 7, wherein said passive differential electrical component is formed from a first capacitance and from a second capacitance which are arranged in parallel, the first electrical excitation signal being intended for the first capacitance, whilst a fourth electrical signal, inverted relative to the first electrical signal and able to be generated by the excitation circuit, is intended for the second capacitance.

9. The electronic measuring device according to claim 8, wherein the first and second capacitances have a common terminal which is connected to the feedback loop and to a first input of the amplifier, this amplifier having a second input which receives a reference voltage, in particular an earth voltage, which is applied to said common terminal by the amplifier and the feedback loop; and wherein the feedback loop comprises a reference capacitance which determines the value of said electrical output voltage of the amplifier, this value being substantially proportional to the value of said physical parameter.

10. The electronic measuring device according to claim 9, wherein the first passive electrical component is a programmable capacitance for compensating for the offset with a terminal which is connected to the first input of said amplifier; and wherein the second passive electrical component is a capacitance for compensating for a drift in temperature of said electrical assembly.

11. The electronic measuring device according to claim 1, wherein said electrical component of the compensation circuit is said first passive electrical component, and said electrical excitation signal is said second electrical excitation signal; and wherein the second electrical excitation signal has an amplitude which is an affine function of the absolute temperature.

12. The electronic measuring device according to claim 11, wherein said passive differential electrical component is formed from a first capacitance and from a second capacitance which are arranged in parallel, the first electrical excitation signal being intended for the first capacitance, whilst a third electrical signal, inverted relative to the first electrical signal and able to be generated by the excitation circuit, is supplied to the second capacitance.

13. The electronic measuring device according to claim 12, wherein the first and second capacitances have a common terminal which is connected to the feedback loop and to a first input of the amplifier, this amplifier having a second input which receives a reference voltage, in particular an earth voltage, which is applied to said common terminal by the amplifier and the feedback loop; and wherein the feedback loop comprises a reference capacitance which determines the value of said electrical output voltage of the amplifier, this value being substantially proportional to the value of said physical parameter.

14. The electronic measuring device according to claim 13, wherein the first passive electrical component is a programmable capacitance for compensating for the offset and for a drift in temperature of said electrical assembly, this programmable capacitance having a terminal which is connected to the first input of said amplifier.

15. The electronic measuring device according to claim 1, wherein said electrical component of the compensation circuit is a second passive electrical component; and wherein said electrical excitation signal is a third electrical excitation signal, the amplitude of which is substantially a linear function of the absolute temperature, the second electrical excitation signal, which is intended for the first passive electrical component, being a constant amplitude signal.

16. The electronic measuring device according to claim 15, wherein said passive differential electrical component is formed from a first capacitance and from a second capacitance which are arranged in parallel, the first electrical excitation signal being intended for the first capacitance, whilst a fourth electrical signal, inverted relative to the first electrical signal and able to be generated by the excitation circuit, is intended for the second capacitance.

17. The electronic measuring device according to claim 16, wherein the first and second capacitances have a common terminal which is connected to the feedback loop and to a first input of the amplifier, this amplifier having a second input which receives a reference voltage, in particular an earth voltage, which is applied to said common terminal by the amplifier and the feedback loop; and wherein the feedback loop comprises a reference capacitance which determines the value of said electrical output voltage of the amplifier, this value being substantially proportional to the value of said physical parameter.

18. The electronic measuring device according to claim 17, wherein the first passive electrical component is a programmable capacitance for compensating for the offset with a terminal which is connected to the first input of said amplifier; and wherein the second passive electrical component is a capacitance for compensating for a drift in temperature of said electrical assembly.

* * * * *